(12) United States Patent
Lewis

(10) Patent No.: US 7,189,671 B1
(45) Date of Patent: *Mar. 13, 2007

(54) GLASS COMPOSITIONS

(75) Inventor: Albert Lewis, Chino, CA (US)

(73) Assignee: Glass Incorporated, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/260,548

(22) Filed: Oct. 27, 2005

(51) Int. Cl.
 C03C 13/06 (2006.01)
 C03C 13/00 (2006.01)
 C03C 3/087 (2006.01)

(52) U.S. Cl. ............... 501/36; 501/35; 501/70; 501/68; 501/69

(58) Field of Classification Search ........... 501/35, 501/36, 68–70
 See application file for complete search history.

(56) References Cited

U.S. PATENT DOCUMENTS

| | | | | |
|---|---|---|---|---|
| 3,854,986 A | * | 12/1974 | Chvalovsky et al. | 428/391 |
| 3,858,964 A | * | 1/1975 | Piesslinger et al. | 385/141 |
| 5,576,252 A | * | 11/1996 | Rapp et al. | 501/35 |
| 5,962,354 A | * | 10/1999 | Fyles et al. | 501/36 |
| 6,794,322 B2 | * | 9/2004 | Sircar | 501/57 |
| 6,998,361 B2 | * | 2/2006 | Lewis | 501/36 |
| 2002/0077243 A1 | * | 6/2002 | Sircar | 501/35 |
| 2004/0092379 A1 | * | 5/2004 | Lewis | 501/70 |
| 2005/0079970 A1 | * | 4/2005 | Otaki et al. | 501/35 |
| 2005/0085369 A1 | * | 4/2005 | Jensen | 501/35 |

* cited by examiner

*Primary Examiner*—J. A. Lorengo
*Assistant Examiner*—Elizabeth A. Bolden
(74) *Attorney, Agent, or Firm*—Boniard I. Brown

(57) ABSTRACT

Improved glass fibers compositions, typically useful for fire resistant blankets or containers to provide high burn-through resistance at high temperatures of 2,400° F. and higher, and typically comprising silica, sodium oxide, potassium oxide, calcium oxide, magnesium oxide, ferrous+ferric oxide, and titanium oxide; the improved glass compositions may further include alumina, lithium oxide, and boron oxide.

38 Claims, No Drawings

GLASS COMPOSITIONS

RELATED APPLICATIONS

The present application is related to U.S. application Ser. No. 10/667,179, filed Sep. 19, 2003, now U.S. Pat. No. 6,998,361 dated Feb. 14, 2006, and to U.S. application Ser. No. 10/090,346, now abandoned.

BACKGROUND AND SUMMARY OF THE INVENTION

The present invention relates to glass compositions, particularly glass compositions having good fiberizing characteristics, high strength, high durability at high temperatures, and high modulus of elasticity.

There has existed a demand for fiber glass compositions which can be successfully formed into fibers particularly for use in insulation and acoustical applications.

Problems associated with achieving such characteristics and the providing of an appropriate product at reasonable cost have long been recognized in the glass art, but satisfactory compositions have not been available for the forming of long and small diameter glass fibers having desired characteristics.

High temperature glass compositions of the prior art have been subject to the shortcomings of having short working temperature ranges and/or being too expensive to produce because of the high costs of raw material and/or energy requirements.

Glass fibers compositions for commercial aircraft are of particular importance and the Federal Aviation Administration has long made requirements relative to aircraft safety. Lives have been lost and aircraft destroyed by fire, as is well known. Many of such crashes have been blamed on insulation blankets which did not retard fire because the blankets embodied fibers which melted at the high temperatures involved.

An object of the present invention is the provision of glass fibers having good insulation and acoustical properties, high temperature resistance, and high strength and modulus of elasticity.

Another object is the provision of glasses of high strength and capable of being drawn into long, strong glass fibers.

Substantial economy is achieved through the utilization of relatively inexpensive raw materials and relatively low energy consumption. Compositions according to the present invention effect a cost reduction of approximately 20% when compared to other high temperature fibers because the use of relatively less expensive raw materials and low energy requirements in processing the materials into glass fibers. In addition, it has been found that less binder is required than in known available compositions because of the improved surface condition and high strength of the fibers. Reduced refining time may be required to provide freedom from impurities, thus, allowing continuous or discontinuous fibers to be manufactured with relative ease. The glass compositions of the present invention can be formed into long and/or short stable glass fibers.

DESCRIPTION OF THE PREFERRED EMBODIMENTS

The present invention, like Applicant's earlier identified prior application, relates to glass compositions and particularly to glass compositions having good fiberizing characteristics, high strength, high durability at high temperatures, and high modulus of elasticity.

In the course of research efforts and development work, a wide range of fiber diameters have been investigated, typically ranging from 0.5 to 5 microns, with high temperature insulation values obtained throughout such range and independent of fiber diameters, thus satisfying Federal Aviation Authority burn-through requirements.

The glass specimens were prepared utilizing specific raw materials which included silica, alumina, titania, and other oxides. Glasses were prepared by melting raw batch material in temperature range between about 2,600° F. to about 3,000° F. utilizing conventional refractory containers. Glass compositions according to the present invention may have a liquidous temperature of approximately 2,400° F., and thus suitable for glass forming.

The glasses can be formed into fibers for insulation and acoustical components utilizing the centrifugal rotary process, vertical and horizontal, or blowing and flame processes. It can be drawn into continuous and stable fibers.

The material according to the invention differs from fibers of the prior art in providing good resistance to devitrification at the forming temperature, and requiring less processing energy than other high temperature fibers.

The molten glass may be formed into fibers on a conventional drawing wheel at speeds up to 12,000 feet per minute and at temperatures between 2,400° F. to about 2,600° F. Speeds between about 3,000 to about 10,000 feet per minute are preferable in order to provide optimum filament properties. Fibers may be drawn from about 9 microns to about 14 microns in diameter, diameters of about 9 microns being preferred, and fibers being produced by centrifugal, blowing and flame processes.

In the course of the research work, resultant fibers were collected on a metal conveyor, and maintained thereon during the rest of the manufacture process.

Insulation fiber diameters may typically range from about 0.5 to 5 microns.

In the development research, it has been postulated that the results obtained are provided by the amorphous glass fibers being converted during burn-through tests into a ceram glass which forms a fiber mat wherein fiber integrity is maintained, thus preventing high temperatures from penetrating the insulation blanket containing the fibers. A batch blend forms fibers which are heat and fire resistant, temperatures as high as 2,400° F.

The glass compositions developed provide glasses having good fiberizing characteristics, high strength, durability, high modulus of elasticity and very good thermal insulation and acoustical properties.

Research efforts were directed to meet a need for a replacement material for aircraft burn-through and acoustical requirements which required that fibers be within the 0.5 to 2.0 micron range.

In the course of the research work, it was postulated that the long term results obtained are provided by the amorphous glass fibers being converted during the burn-through tests into a ceram glass forming a fiber mat in which the fiber integrity is maintained, thus preventing high temperatures from penetrating the insulation blanket containing the fibers according to the invention. Fibers temperatures as high as 2,400° F. plus meet FAA burn-through requirements when used as aircraft insulation blankets.

In the initial development work which followed the research work discussed in my earlier patent application, an object was to improve desired properties while reducing the complexity of the process through the selection and use of different and fewer oxides.

The typical glass composition batch blends were mixed and melted in a refractory furnace and the resultant glasses were successfully fiberized into continuous and non-continuous glass fibers.

Set forth below are illustrative examples of embodiments of the present invention.

| Oxides | Ex. 1 wt % | Ex. 2 wt % | Ex. 3 wt % | Ex. 4 wt % | Ex. 5 wt % | Ex. 6 wt % | Ex. 7 wt % |
|---|---|---|---|---|---|---|---|
| $SiO_2$ | 81.59 | 67.83 | 76.78 | 67.83 | 72.26 | 72.38 | 73.48 |
| $Al_2O_3$ | 0.00 | 9.80 | 0.00 | 7.85 | 0.00 | 2.20 | 2.00 |
| $Na_2O$ | 2.40 | 1.97 | 2.26 | 1.97 | 2.36 | 2.25 | 1.57 |
| $K_2O$ | 0.82 | 0.67 | 2.26 | 0.67 | 1.04 | 0.00 | 0.00 |
| CaO | 3.31 | 6.77 | 3.79 | 6.77 | 8.34 | 7.31 | 7.18 |
| MgO | 1.06 | 3.31 | 1.83 | 3.31 | 4.09 | 3.08 | 3.01 |
| $Fe_2O_3 + FeO$ | 10.18 | 8.35 | 11.60 | 10.31 | 10.31 | 10.33 | 10.18 |
| $TiO_2$ | 1.29 | 1.29 | 1.48 | 1.29 | 1.60 | 0.00 | 0.00 |
| $B_2O_3$ | 0.00 | 0.00 | 0.00 | 0.00 | 0.00 | 2.41 | 0.00 |
| $Li_2O$ | 0.00 | 0.00 | 0.00 | 0.00 | 0.00 | 0.00 | 1.01 |

| Oxides | Ex. 8 wt % | Ex. 9 wt % | Ex. 10 wt % | Ex. 11 wt % | Ex. 12 wt % | Ex. 13 wt % | Ex. 14 wt % |
|---|---|---|---|---|---|---|---|
| $SiO_2$ | 61.65 | 46.47 | 56.47 | 61.34 | 65.55 | 54.07 | 70.50 |
| $Al_2O_3$ | 11.82 | 26.04 | 16.04 | 11.77 | 11.23 | 13.94 | 0.00 |
| $Na_2O$ | 2.57 | 2.41 | 2.41 | 2.36 | 2.26 | 2.81 | 3.30 |
| $K_2O$ | 0.00 | 0.82 | 0.82 | 0.80 | 2.26 | 0.96 | 1.80 |
| CaO | 8.18 | 8.31 | 12.31 | 8.14 | 3.79 | 9.68 | 10.00 |
| MgO | 4.01 | 4.08 | 0.00 | 3.99 | 3.81 | 4.74 | 5.00 |
| $Fe_2O_3 + FeO$ | 10.18 | 10.27 | 10.27 | 10.04 | 9.60 | 11.95 | 8.30 |
| $TiO_2$ | 1.57 | 1.59 | 1.59 | 1.56 | 1.48 | 1.84 | 1.10 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |

| Oxides | Ex. 15 wt % | Ex. 16 wt % | Ex. 17 wt % | Ex. 18 wt % | Ex. 19 wt % | Ex. 20 wt % | Ex. 21 wt % |
|---|---|---|---|---|---|---|---|
| $SiO_2$ | 67.83 | 72.63 | 70.50 | 72.38 | 77.78 | 73.83 | 77.63 |
| $Al_2O_3$ | 9.80 | 3.00 | 1.00 | 0.00 | 0.00 | 0.00 | 0.00 |
| $Na_2O$ | 1.97 | 3.97 | 5.04 | 2.41 | 2.57 | 2.31 | 1.97 |
| $K_2O$ | 0.67 | 0.67 | 1.01 | 0.95 | 2.57 | 1.81 | 0.67 |
| CaO | 6.77 | 6.77 | 6.56 | 8.31 | 3.78 | 8.42 | 6.77 |
| MgO | 3.31 | 3.31 | 4.28 | 4.08 | 3.98 | 3.99 | 3.31 |
| $Fe_2O_3 + FeO$ | 8.35 | 8.35 | 10.28 | 10.27 | 8.60 | 8.54 | 8.36 |
| $TiO_2$ | 1.29 | 1.29 | 1.34 | 1.60 | 0.71 | 1.10 | 1.29 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |

| Oxides | Ex. 22 wt % | Ex. 23 wt % | Ex. 24 wt % | Ex. 25 wt % | Ex. 26 wt % | Ex. 27 wt % | Ex. 28 wt % |
|---|---|---|---|---|---|---|---|
| $SiO_2$ | 80.49 | 73.54 | 77.20 | 81.59 | 77.63 | 75.63 | 78.61 |
| $Al_2O_3$ | 0.00 | 0.00 | 0.00 | 0.00 | 0.00 | 0.00 | 0.00 |
| $Na_2O$ | 2.04 | 2.45 | 2.55 | 2.06 | 0.67 | 0.67 | 3.97 |
| $K_2O$ | 0.01 | 0.97 | 2.55 | 0.01 | 1.97 | 1.97 | 0.67 |
| CaO | 6.55 | 8.44 | 3.75 | 6.64 | 6.77 | 6.77 | 6.40 |
| MgO | 4.27 | 4.15 | 3.95 | 4.33 | 3.31 | 3.31 | 0.00 |
| $Fe_2O_3 + FeO$ | 5.28 | 10.43 | 9.96 | 5.35 | 8.35 | 10.36 | 10.35 |
| $TiO_2$ | 1.37 | 0.00 | 0.00 | 0.00 | 1.29 | 1.29 | 0.00 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |

| Oxides | Ex. 29 wt % | Ex. 30 wt % | Ex. 31 wt % | Ex. 32 wt % | Ex. 33 wt % | Ex. 34 wt % | Ex. 35 wt % |
|---|---|---|---|---|---|---|---|
| $SiO_2$ | 79.33 | 76.34 | 69.93 | 78.44 | 67.06 | 65.74 | 78.62 |
| $Al_2O_3$ | 0.00 | 0.00 | 0.00 | 0.00 | 3.00 | 1.00 | 0.00 |
| $Na_2O$ | 1.03 | 0.00 | 2.92 | 2.91 | 14.33 | 16.00 | 0.00 |
| $K_2O$ | 0.00 | 0.00 | 0.96 | 0.00 | 0.42 | 0.00 | 0.83 |
| CaO | 5.43 | 7.14 | 8.40 | 6.63 | 6.23 | 6.70 | 8.60 |
| MgO | 3.91 | 3.99 | 0.00 | 3.09 | 3.06 | 3.85 | 2.05 |
| $Fe_2O_3 + FeO$ | 8.78 | 8.95 | 11.94 | 8.94 | 3.70 | 2.37 | 8.78 |
| $TiO_2$ | 1.52 | 0.57 | 1.84 | 0.00 | 0.00 | 0.00 | 1.13 |
| $B_2O_3$ | 0.00 | 3.01 | 4.01 | 0.00 | 2.01 | 4.00 | 0.00 |
| $Li_2O$ | 0.00 | 0.00 | 0.00 | 0.00 | 0.00 | 0.00 | 0.00 |

| Oxides | Ex. 36 wt % | Ex. 37 wt % | Ex. 38 wt % | Ex. 39 wt % | Ex. 40 wt % | Ex. 41 wt % | Ex. 42 wt % |
|---|---|---|---|---|---|---|---|
| $SiO_2$ | 72.38 | 78.34 | 78.34 | 70.05 | 72.51 | 72.51 | 73.10 |
| $Al_2O_3$ | 0.00 | 0.00 | 0.00 | 2.00 | 0.00 | 0.00 | 0.00 |
| $Na_2O$ | 2.55 | 2.59 | 2.03 | 11.57 | 2.41 | 2.41 | 1.36 |
| $K_2O$ | 0.00 | 0.00 | 0.00 | 0.00 | 0.00 | 0.82 | 0.00 |
| CaO | 8.31 | 4.02 | 6.55 | 7.18 | 8.31 | 8..31 | 8.14 |
| MgO | 4.02 | 0.81 | 3.27 | 3.01 | 4.08 | 4.08 | 3.99 |
| $Fe_2O_3 + FeO$ | 10.33 | 10.18 | 8.53 | 5.18 | 10.27 | 10.27 | 10.04 |
| $TiO_2$ | 0.00 | 0.00 | 0.00 | 0.00 | 1.59 | 1.59 | 1.56 |
| $B_2O_3$ | 2.41 | 4.24 | 1.01 | 0.00 | 0.00 | 0.00 | 0.00 |
| $Li_2O$ | 0.00 | | 0.00 | 1.01 | 0.83 | 0.00 | 1.81 |

| Oxides | Ex. 43 wt % | Ex. 44 wt % | Ex. 45 wt % |
|---|---|---|---|
| $SiO_2$ | 72.78 | 77.23 | 75.36 |
| $Al_2O_3$ | 0.00 | 0.37 | 0.15 |
| $Na_2O$ | 2.26 | 1.92 | 3.97 |
| $K_2O$ | 1.26 | 0.67 | 0.67 |
| CaO | 3.79 | 6.22 | 6.22 |
| MgO | 2.81 | 4.04 | 4.06 |
| $Fe_2O_3 + FeO$ | 9.60 | 8.28 | 8.30 |
| $TiO_2$ | 1.48 | 1.27 | 1.27 |
| $B_2O_3$ | 0.00 | 0.00 | 0.00 |
| $Li_2O$ | 6.01 | 0.00 | 0.00 |

In the research work, resultant fibers were collected on a metal conveyor, and maintained thereon during the rest of the manufacture process.

Compositions according to the present invention provided a reduction in cost when compared to other high temperature insulation materials being tested as a replacement for fiber blankets currently being used in aircraft. Typical raw materials used were silica sand, iron oxide, kaolin, soda ash, pot ash, lithium carbonate, borax, dolomite limestone, limestone, titania dioxide, fly ash, and basalt.

Fibers according to the present invention, for insulation blankets for aircraft, may have the following components with the stated ranges of percentages:

TABLE 1

COMPOSITIONAL RANGES

| Oxides | Oxide Weight % |
|---|---|
| $SiO_2$ | 40.00 to 82.00 |
| $Al_2O_3$ | 0.00 to 27.00 |
| $Na_2O$ | 0.00 to 6.00 |
| $K_2O$ | 0.00 to 4.00 |
| CaO | 0.00 to 10.00 |
| MgO | 0.00 to 5.00 |

TABLE 1-continued

COMPOSITIONAL RANGES

| Oxides | Oxide Weight % |
|---|---|
| $Fe_2O_3$ + FeO | 0.00 to 12.00 |
| $TiO_2$ | 0.00 to 2.00 |
| $B_2O_3$ | 0.00 to 5.00 |
| $LiO_2$ | 0.00 to 7.00 |

TABLE 2

| Oxides | Oxide Weight % |
|---|---|
| $SiO_2$ | 60.00 to 82.00 |
| $Na_2O$ | 0.00 to 14.00 |
| $K_2O$ | 0.00 to 3.00 |
| CaO | 0.00 to 10.00 |
| MgO | 0.00 to 5.00 |
| $Fe_2O_3$ + FeO | 0.00 to 12.00 |
| $TiO_2$ | 0.00 to 2.00 |
| $B_2O_3$ | 0.00 to 6.00 |
| $LiO_2$ | 0.00 to 6.00 |

High temperature fibers described herein, are less expensive to produce because of the utilization of relatively lower cost materials, the lower energy and the higher productivity in the processing of the materials into glass fibers. In addition, it has been determined that less binder is required than in insulation fibers commercially available because of the improved surface condition and high strength of the fibers. Insulation fiber diameters may range from about 0.5 to 5 microns. All of the described processes may be utilized to manufacture glass fibers in the above-noted diameter range.

A preferred fiber diameter for aircraft fibrous blankets is 0.5 to 2.0 microns. The chemical components of the glass compositions herein described for a tightly bonded surface result in a very high strength and high chemical resistance, which are characteristically required in aircraft. Another advantage of fiber blankets according to the present invention is their ability to repel liquids when treated properly.

It will be understood that various changes and modifications may be made from the preferred embodiments discussed above without departing from the scope of the present invention, which is established by the following claims and equivalents thereof.

The inventor claims:

1. A glass composition for forming glass fibers of high heat resistance, comprising:
   $SiO_2$ in an amount of about 61.65 weight percent,
   $Al_2O_3$ in an amount of about 11.82 weight percent,
   $Na_2O$ in an amount of about 2.57 weight percent,
   $K_2O$ in an amount of about 0.00 weight percent,
   CaO in an amount of about 8.18 weight percent,
   MgO in an amount of about 4.01 weight percent,
   $Fe_2O_3$+FeO in an amount of about 10.18 weight percent, and
   $TiO_2$ in an amount of about 1.57 weight percent.

2. A glass composition for forming glass fibers of high heat resistance, comprising:
   $SiO_2$ in an amount of about 46.47 weight percent,
   $Al_2O_3$ in an amount of about 26.04 weight percent,
   $Na_2O$ in an amount of about 2.41 weight percent,
   $K_2O$ in an amount of about 0.82 weight percent,
   CaO in an amount of about 8.31 weight percent,
   MgO in an amount of about 4.08 weight percent,
   $Fe_2O_3$+FeO in an amount of about 10.27 weight percent, and
   $TiO_2$ in an amount of about 1.59 weight percent.

3. A glass composition for forming glass fibers of high heat resistance, comprising:
   $SiO_2$ in an amount of about 56.47 weight percent,
   $Al_2O_3$ in an amount of about 16.04 weight percent,
   $Na_2O$ in an amount of about 2.41 weight percent,
   $K_2O$ in an amount of about 0.82 weight percent,
   CaO in an amount of about 12.31 weight percent,
   MgO in an amount of about 0.00 weight percent,
   $Fe_2O_3$+FeO in an amount of about 10.27 weight percent, and
   $TiO_2$ in an amount of about 1.59 weight percent.

4. A glass composition for forming glass fibers of high heat resistance, comprising:
   $SiO_2$ in an amount of about 61.34 weight percent,
   $Al_2O_3$ in an amount of about 11.77 weight percent,
   $Na_2O$ in an amount of about 2.36 weight percent,
   $K_2O$ in an amount of about 0.80 weight percent,
   CaO in an amount of about 8.14 weight percent,
   MgO in an amount of about 3.99 weight percent,
   $Fe_2O_3$+FeO in an amount of about 10.04 weight percent, and
   $TiO_2$ in an amount of about 1.56 weight percent.

5. A glass composition for forming glass fibers of high heat resistance, comprising:
   $SiO_2$ in an amount of about 76.78 weight percent,
   $Al_2O_3$ in an amount of about 0 weight percent,
   $Na_2O$ in an amount of about 2.26 weight percent,
   $K_2O$ in an amount of about 2.26 weight percent,
   CaO in an amount of about 3.79 weight percent,
   MgO in an amount of about 1.82 weight percent,
   $Fe_2O_3$+FeO in an amount of about 11.60 weight percent, and
   $TiO_2$ in an amount of about 1.48 weight percent.

6. A glass composition for forming glass fibers of high heat resistance, comprising:
   $SiO_2$ in an amount of about 65.55 weight percent,
   $Al_2O_3$ in an amount of about 11.23 weight percent,
   $Na_2O$ in an amount of about 2.26 weight percent,
   $K_2O$ in an amount of about 2.26 weight percent,
   CaO in an amount of about 3.79 weight percent,
   MgO in an amount of about 3.81 weight percent,
   $Fe_2O_3$+FeO in an amount of about 9.60 weight percent, and
   $TiO_2$ in an amount of about 1.48 weight percent.

7. A glass composition for forming glass fibers of high heat resistance, comprising:
   $SiO_2$ in an amount of about 70.50 weight percent,
   $Al_2O_3$ in an amount of about 0 weight percent,
   $Na_2O$ in an amount of about 3.30 weight percent,
   $K_2O$ in an amount of about 1.80 weight percent,
   CaO in an amount of about 10.00 weight percent,
   MgO in an amount of about 5.00 weight percent,
   $Fe_2O_3$+FeO in an amount of about 8.30 weight percent, and
   $TiO_2$ in an amount of about 1.10 weight percent.

8. A glass composition for forming glass fibers of high heat resistance, comprising:
   $SiO_2$ in an amount of about 72.63 weight percent,
   $Al_2O_3$ in an amount of about 3.00 weight percent,
   $Na_2O$ in an amount of about 3.97 weight percent,
   $K_2O$ in an amount of about 0.67 weight percent,
   CaO in an amount of about 6.77 weight percent,
   MgO in an amount of about 3.31 weight percent, Fe₂O₃+FeO in an amount of about 8.35 weight percent, and TiO₂ in an amount of about 1.29 weight percent.

9. A glass composition for forming glass fibers of high heat resistance, comprising:
   SiO₂ in an amount of about 70.50 weight percent,
   Al₂O₃ in an amount of about 1.00 weight percent,
   Na₂O in an amount of about 5.04 weight percent,
   K₂O in an amount of about 1.01 weight percent,
   CaO in an amount of about 6.56 weight percent,
   MgO in an amount of about 4.28 weight percent,
   Fe₂O₃+FeO in an amount of about 10.28 weight percent, and
   TiO₂ in an amount of about 1.34 weight percent.

10. A glass composition for forming glass fibers of high heat resistance, comprising:
    SiO₂ in an amount of about 72.38 weight percent,
    Al₂O₃ in an amount of about 0.00 weight percent,
    Na₂O in an amount of about 2.41 weight percent,
    K₂O in an amount of about 0.95 weight percent,
    CaO in an amount of about 8.31 weight percent,
    MgO in an amount of about 4.08 weight percent,
    Fe₂O₃+FeO in an amount of about 10.27 weight percent, and
    TiO₂ in an amount of about 1.60 weight percent.

11. A glass composition for forming glass fibers of high heat resistance, comprising:
    SiO₂ in an amount of about 77.78 weight percent,
    Al₂O₃ in an amount of about 0.00 weight percent,
    Na₂O in an amount of about 2.57 weight percent,
    K₂O in an amount of about 2.57 weight percent,
    CaO in an amount of about 3.78 weight percent,
    MgO in an amount of about 3.98 weight percent,
    Fe₂O₃+FeO in an amount of about 8.60 weight percent, and
    TiO₂ in an amount of about 0.71 weight percent.

12. A glass composition for forming glass fibers of high heat resistance, comprising:
    SiO₂ in an amount of about 73.83 weight percent,
    Al₂O₃ in an amount of about 0.00 weight percent,
    Na₂O in an amount of about 2.31 weight percent,
    K₂O in an amount of about 1.81 weight percent,
    CaO in an amount of about 8.42 weight percent,
    MgO in an amount of about 3.99 weight percent,
    Fe₂O₃+FeO in an amount of about 8.54 weight percent, and
    TiO₂ in an amount of about 1.10 weight percent.

13. A glass composition for forming glass fibers of high heat resistance, comprising:
    SiO₂ in an amount of about 77.63 weight percent,
    Al₂O₃ in an amount of about 0.00 weight percent,
    Na₂O in an amount of about 1.97 weight percent,
    K₂O in an amount of about 0.67 weight percent,
    CaO in an amount of about 6.77 weight percent,
    MgO in an amount of about 3.31 weight percent,
    Fe₂O₃+FeO in an amount of about 8.36 weight percent, and
    TiO₂ in an amount of about 1.29 weight percent.

14. A glass composition for forming glass fibers of high heat resistance, comprising:
    SiO₂ in an amount of about 80.49 weight percent,
    Al₂O₃ in an amount of about 0.00 weight percent,
    Na₂O in an amount of about 2.03 weight percent,
    K₂O in an amount of about 0.01 weight percent,
    CaO in an amount of about 6.55 weight percent,
    MgO in an amount of about 4.27 weight percent,
    Fe₂O₃+FeO in an amount of about 5.28 weight percent, and
    TiO₂ in an amount of about 1.37 weight percent.

15. A glass composition for forming glass fibers of high heat resistance, comprising:
    SiO₂ in an amount of about 73.54 weight percent,
    Al₂O₃ in an amount of about 0.00 weight percent,
    Na₂O in an amount of about 2.45 weight percent,
    K₂O in an amount of about 0.97 weight percent,
    CaO in an amount of about 8.44 weight percent,
    MgO in an amount of about 4.15 weight percent,
    Fe₂O₃+FeO in an amount of about 10.43 weight percent, and
    TiO₂ in an amount of about 0.00 weight percent.

16. A glass composition for forming glass fibers of high heat resistance, comprising:
    SiO₂ in an amount of about 77.20 weight percent,
    Al₂O₃ in an amount of about 0.00 weight percent,
    Na₂O in an amount of about 2.55 weight percent,
    K₂O in an amount of about 2.55 weight percent,
    CaO in an amount of about 3.75 weight percent,
    MgO in an amount of about 3.95 weight percent,
    Fe₂O₃+FeO in an amount of about 9.96 weight percent, and
    TiO₂ in an amount of about 0.00 weight percent.

17. A glass composition for forming glass fibers of high heat resistance, comprising:
    SiO₂ in an amount of about 81.59 weight percent,
    Al₂O₃ in an amount of about 0.00 weight percent,
    Na₂O in an amount of about 2.06 weight percent,
    K₂O in an amount of about 0.01 weight percent,
    CaO in an amount of about 6.64 weight percent,
    MgO in an amount of about 4.33 weight percent,
    Fe₂O₃+FeO in an amount of about 5.35 weight percent, and
    TiO₂ in an amount of about 0.00 weight percent.

18. A glass composition for forming glass fibers of high heat resistance, comprising:
    SiO₂ in an amount of about 77.63 weight percent,
    Na₂O in an amount of about 0.67 weight percent,
    K₂O in an amount of about 1.97 weight percent,
    CaO in an amount of about 6.77 weight percent,
    MgO in an amount of about 3.31 weight percent,
    Fe₂O₃+FeO in an amount of about 8.35 weight percent, and
    TiO₂ in an amount of about 1.29 weight percent.

19. A glass composition for forming glass fibers of high heat resistance, comprising:
    SiO₂ in an amount of about 75.63 weight percent,
    Na₂O in an amount of about 0.67 weight percent,
    K₂O in an amount of about 1.97 weight percent,
    CaO in an amount of about 6.77 weight percent,
    MgO in an amount of about 3.31 weight percent,
    Fe₂O₃+FeO in an amount of about 10.36 weight percent, and
    TiO₂ in an amount of about 1.29 weight percent.

20. A glass composition for forming glass fibers of high heat resistance, comprising:
    SiO₂ in an amount of about 78.61 weight percent,
    Na₂O in an amount of about 3.97 weight percent,
    K₂O in an amount of about 0.67 weight percent,
    CaO in an amount of about 6.40 weight percent, and
    Fe₂O₃+FeO in an amount of about 10.35 weight percent.

21. A glass composition for forming glass fibers of high heat resistance, comprising:
    SiO₂ in an amount of about 72.26 weight percent,
    Na₂O in an amount of about 2.36 weight percent, K$_2$O in an amount of about 1.04 weight percent,
CaO in an amount of about 8.34 weight percent,
MgO in an amount of about 4.09 weight percent,
Fe$_2$O$_3$+FeO in an amount of about 10.31 weight percent, and
TiO$_2$ in an amount of about 1.60 weight percent.

22. A glass composition for forming glass fibers of high heat resistance, comprising:
SiO$_2$ in an amount of about 79.33 weight percent,
Na$_2$O in an amount of about 1.03 weight percent,
CaO in an amount of about 5.43 weight percent,
MgO in an amount of about 3.91 weight percent,
Fe$_2$O$_3$+FeO in an amount of about 8.78 weight percent, and
TiO$_2$ in an amount of about 1.52 weight percent.

23. A glass composition for forming glass fibers of high heat resistance, comprising:
SiO$_2$ in an amount of about 76.34 weight percent,
CaO in an amount of about 7.14 weight percent,
MgO in an amount of about 3.99 weight percent,
Fe$_2$O$_3$+FeO in an amount of about 8.95 weight percent,
TiO$_2$ in an amount of about 0.57 weight percent, and
B$_2$O$_3$ in an amount of about 3.01 weight percent.

24. A glass composition for forming glass fibers of high heat resistance, comprising:
SiO$_2$ in an amount of about 69.93 weight percent,
Na$_2$O in an amount of about 2.92 weight percent,
K$_2$O in an amount of about 0.96 weight percent,
CaO in an amount of about 8.40 weight percent,
Fe$_2$O$_3$+FeO in an amount of about 11.94 weight percent,
TiO$_2$ in an amount of about 1.84 weight percent, and
B$_2$O$_3$ in an amount of about 4.01 weight percent.

25. A glass composition for forming glass fibers of high heat resistance, comprising:
SiO$_2$ in an amount of about 78.44 weight percent,
Na$_2$O in an amount of about 2.91 weight percent,
CaO in an amount of about 6.63 weight percent,
MgO in an amount of about 3.09 weight percent, and
Fe$_2$O$_3$+FeO in an amount of about 8.94 weight percent.

26. A glass composition for forming glass fibers of high heat resistance, comprising:
SiO$_2$ in an amount of about 67.06 weight percent,
Al$_2$O$_3$ in an amount of about 3.00 weight percent,
Na$_2$O in an amount of about 14.33 weight percent,
K$_2$O in an amount of about 0.42 weight percent,
CaO in an amount of about 6.23 weight percent,
MgO in an amount of about 3.06 weight percent,
Fe$_2$O$_3$+FeO in an amount of about 3.70 weight percent, and
B$_2$O$_3$ in an amount of about 2.01 weight percent.

27. A glass composition for forming glass fibers of high heat resistance, comprising:
SiO$_2$ in an amount of about 65.74 weight percent,
Al$_2$O$_3$ in an amount of about 1.00 weight percent,
Na$_2$O in an amount of about 16.00 weight percent,
CaO in an amount of about 6.70 weight percent,
MgO in an amount of about 3.85 weight percent,
Fe$_2$O$_3$+FeO in an amount of about 2.37 weight percent, and
B$_2$O$_3$ in an amount of about 4.00 weight percent.

28. A glass composition for forming glass fibers of high heat resistance, comprising:
SiO$_2$ in an amount of about 78.62 weight percent,
K$_2$O in an amount of about 0.83 weight percent,
CaO in an amount of about 8.60 weight percent,
MgO in an amount of about 2.05 weight percent,
Fe$_2$O$_3$+FeO in an amount of about 8.78 weight percent, and
TiO$_2$ in an amount of about 1.13 weight percent.

29. A glass composition for forming glass fibers of high heat resistance, comprising:
SiO$_2$ in an amount of about 72.38 weight percent,
Na$_2$O in an amount of about 2.55 weight percent,
CaO in an amount of about 8.31 weight percent,
MgO in an amount of about 4.08 weight percent,
Fe$_2$O$_3$+FeO in an amount of about 10.33 weight percent, and
B$_2$O$_3$ in an amount of about 2.41 weight percent.

30. A glass composition for forming glass fibers of high heat resistance, comprising:
SiO$_2$ in an amount of about 78.34 weight percent,
Na$_2$O in an amount of about 2.59 weight percent,
CaO in an amount of about 4.02 weight percent,
MgO in an amount of about 0.81 weight percent,
Fe$_2$O$_3$+FeO in an amount of about 10.18 weight percent, and
B$_2$O$_3$ in an amount of about 4.24 weight percent.

31. A glass composition for forming glass fibers of high heat resistance, comprising:
SiO$_2$ in an amount of about 78.34 weight percent,
Na$_2$O in an amount of about 2.03 weight percent,
CaO in an amount of about 6.55 weight percent,
MgO in an amount of about 3.27 weight percent,
Fe$_2$O$_3$+FeO in an amount of about 8.53 weight percent, and
B$_2$O$_3$ in an amount of about 1.01 weight percent.

32. A glass composition for forming glass fibers of high heat resistance, comprising:
SiO$_2$ in an amount of about 70.05 weight percent,
Al$_2$O$_3$ in an amount of about 2.00 weight percent,
Na$_2$O in an amount of about 11.57 weight percent,
CaO in an amount of about 7.18 weight percent,
MgO in an amount of about 3.01 weight percent,
Fe$_2$O$_3$+FeO in an amount of about 5.18 weight percent, and
Li$_2$O in an amount of about 1.01 weight percent.

33. A glass composition for forming glass fibers of high heat resistance, comprising:
SiO$_2$ in an amount of about 72.51 weight percent,
Na$_2$O in an amount of about 2.41 weight percent,
CaO in an amount of about 8.31 weight percent,
MgO in an amount of about 4.08 weight percent,
Fe$_2$O$_3$+FeO in an amount of about 10.27 weight percent,
TiO$_2$ in an amount of about 1.59 weight percent, and
Li$_2$O in an amount of about 0.83 weight percent.

34. A glass composition for forming glass fibers of high heat resistance, comprising:
SiO$_2$ in an amount of about 72.51 weight percent,
Na$_2$O in an amount of about 2.41 weight percent,
K$_2$O in an amount of about 0.82 weight percent,
CaO in an amount of about 8.31 weight percent,
MgO in an amount of about 4.08 weight percent,
Fe$_2$O$_3$+FeO in an amount of about 10.27 weight percent, and
TiO$_2$ in an amount of about 1.59 weight percent.

35. A glass composition for forming glass fibers of high heat resistance, comprising:
SiO$_2$ in an amount of about 73.10 weight percent,
Na$_2$O in an amount of about 1.36 weight percent,
CaO in an amount of about 8.14 weight percent,
MgO in an amount of about 3.99 weight percent,
Fe$_2$O$_3$+FeO in an amount of about 10.04 weight percent, TiO$_2$ in an amount of about 1.56 weight percent, and
Li$_2$O in an amount of about 1.81 weight percent.

36. A glass composition for forming glass fibers of high heat resistance, comprising:
SiO$_2$ in an amount of about 72.78 weight percent,
Na$_2$O in an amount of about 2.26 weight percent,
K$_2$O in an amount of about 1.26 weight percent,
CaO in an amount of about 3.79 weight percent,
MgO in an amount of about 2.81 weight percent,
Fe$_2$O$_3$+FeO in an amount of about 9.60 weight percent,
TiO$_2$ in an amount of about 1.48 weight percent, and
Li$_2$O in an about 6.01 weight percent.

37. A glass composition for forming glass fibers of high heat resistance, comprising:
SiO$_2$ in an amount of about 77.23 weight percent,
Al$_2$O$_3$ in an amount of about 0.37 weight percent,
Na$_2$O in an amount of about 1.92 weight percent,
K$_2$O in an amount of about 0.67 weight percent,
CaO in an amount of about 6.22 weight percent,
MgO in an amount of about 4.04 weight percent,
Fe$_2$O$_3$+FeO in an amount of about 8.28 weight percent, and
TiO$_2$ in an amount of about 1.27 weight percent.

38. A glass composition for forming glass fibers of high heat resistance, comprising:
SiO$_2$ in an amount of about 75.36 weight percent,
Al$_2$O$_3$ in an amount of about 0.15 weight percent,
Na$_2$O in an amount of about 3.97 weight percent,
K$_2$O in an amount of about 0.67 weight percent,
CaO in an amount of about 6.22 weight percent,
MgO in an amount of about 4.06 weight percent,
Fe$_2$O$_3$+FeO in an amount of about 8.30 weight percent, and
TiO$_2$ in an amount of about 1.27 weight percent.

* * * * *